United States Patent
Baydoun et al.

(10) Patent No.: US 10,131,295 B2
(45) Date of Patent: Nov. 20, 2018

(54) SYSTEMS AND METHODS FOR SECURING GROMMET TO WIRING

(71) Applicant: Ford Global Technologies, LLC, Dearborn, MI (US)

(72) Inventors: Mohammed Michael Baydoun, Dearborn Heights, MI (US); Hassan Haidar, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 14/989,431

(22) Filed: Jan. 6, 2016

(65) Prior Publication Data

US 2017/0190305 A1 Jul. 6, 2017

(51) Int. Cl.
*B60R 16/02* (2006.01)
*H02G 1/06* (2006.01)
*H02G 3/04* (2006.01)
*H02G 3/22* (2006.01)

(52) U.S. Cl.
CPC ........... *B60R 16/0222* (2013.01); *H02G 1/06* (2013.01); *H02G 3/0406* (2013.01); *H02G 3/22* (2013.01)

(58) Field of Classification Search
CPC ..... B60R 16/0222; H02G 1/06; H02G 3/0406
See application file for complete search history.

(56) References Cited

U.S. PATENT DOCUMENTS

| 3,742,559 A * | 7/1973 | Punako | F16G 11/04 24/16 PB |
| 3,889,909 A * | 6/1975 | Koscik | H02G 3/22 248/56 |
| 4,373,112 A * | 2/1983 | Mizuno | H02G 3/0683 174/153 G |
| 4,640,479 A * | 2/1987 | Shely | H02G 3/0641 16/2.2 |
| 5,044,986 A * | 9/1991 | Baumanis | H01R 13/5202 439/548 |
| 6,259,028 B1 | 7/2001 | Senma | |
| 6,660,937 B1 | 12/2003 | MacLeod et al. | |
| 6,897,380 B2 | 5/2005 | Sakata et al. | |
| 6,960,108 B1 * | 11/2005 | Jaszewski | F16L 3/23 174/152 G |
| 8,033,408 B2 | 10/2011 | Makela et al. | |
| 8,261,409 B2 * | 9/2012 | Magennis | F16L 5/027 16/2.1 |
| 9,068,672 B2 * | 6/2015 | Barrow | B23P 19/04 |
| 9,472,931 B2 * | 10/2016 | Maeda | H02G 3/0462 |
| 2015/0008032 A1 | 1/2015 | Nakai et al. | |

FOREIGN PATENT DOCUMENTS

JP 2005065354 A 3/2005

OTHER PUBLICATIONS

Search Report dated Apr. 25, 2017 for GB Patent Application No. GB1700240.3 (3 pages).

* cited by examiner

*Primary Examiner* — William H Mayo, III
*Assistant Examiner* — Hiram E Gonzalez
(74) *Attorney, Agent, or Firm* — James P. Muraff; Neal, Gerber & Eisenberg LLP

(57) ABSTRACT

Systems and methods are provided for securing wiring to a grommet with embedded lubricant by employing a series of pressure rings both on the interior and exterior of the grommet opening. In exemplary implementation, a tie strap is tightened around the wiring and then forced into the grommet opening before a second tie strap is tightened around both the wiring and grommet opening.

14 Claims, 2 Drawing Sheets

SYSTEMS AND METHODS FOR SECURING GROMMET TO WIRING

TECHNICAL FIELD

The following disclosure relates to a system and method for securing wiring to a grommet that has embedded lubrication.

BACKGROUND OF THE INVENTION

All vehicles have wiring that must be passed through various solid frames and thresholds such as doors and dashboards to enable various features and functionalities of the vehicle. In order to ensure wiring is passed through these barriers in a stable and secure fashion, it is often attached to a grommet which helps to guide and position the wiring from one side of the barrier to another. In order to properly employ a grommet, lubrication is needed to aid the passage of the wiring through the grommet. Previously, lubrication was sprayed onto the grommet during installation. However, this caused a slipping hazard in the vehicle assembly area and was an inefficient use of lubricant. Accordingly, grommets that have lubricant pre-embedded are preferable and are now commonly used. A problem with embedded lubed grommets is that the presence of the lubricant on the grommet makes securing the wiring to it difficult. For example, tape will not easily adhere to the grommet because the lubricant interferes with the tape adhesive. In the absence of being secured, the wiring will slip inside the grommet into an undesirable position. Therefore, there is a need for a way of effectively securing wiring to an embedded lubed grommet.

SUMMARY OF THE INVENTION

Systems and methods are provided for securing wiring to a grommet with embedded lubricant by employing a series of pressure rings both on the interior and exterior of the grommet opening. In exemplary implementation, a tie strap is tightened around the wiring and then forced into the grommet opening before a second tie strap is tightened around both the wiring and grommet opening.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION OF EXEMPLARY EMBODIMENTS OF THE INVENTION

Figure 1:
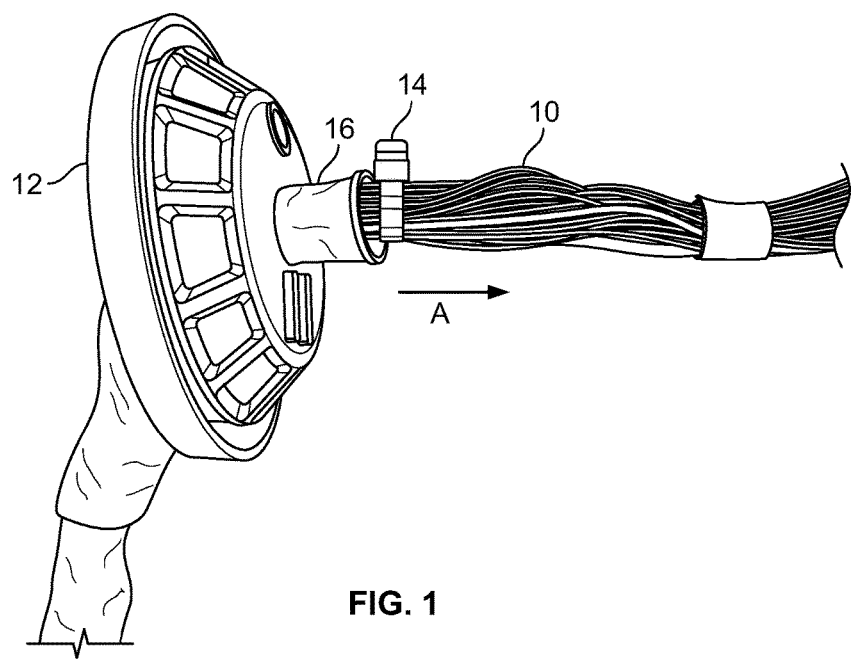
FIG. 1 is an elevated diagram illustrating an exemplary embodiment of a system in accordance with the invention.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIG. 1 illustrates components of an exemplary embodiment system in accordance with the invention. FIG. 1 shows both wiring 10 and the grommet 12 to which the wiring 10 is to be secured. In this exemplary embodiment, the grommet has a lubricant embedded into it. A first pressure ring 14 is secured around the wiring 10. In this exemplary embodiment, the first pressure ring 14 is a tie strap. However, those of ordinary skill in the art will understand that a variety of fasteners capable of fitting around the wiring 10 and forcing it together may be employed without departing from the novel scope of the present invention. After the first pressure ring 14 is secured, the grommet 12 is moved down the wiring 10 in the direction shown by arrow A until the first pressure ring 14 is disposed inside of the grommet opening 16. In this exemplary embodiment, the first pressure ring 14 is positioned at the back of the grommet opening 16.

Figure 2:
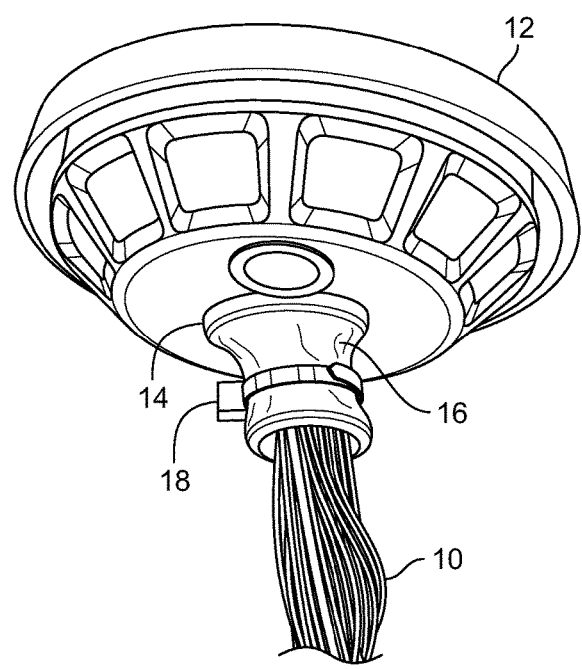
FIG. 2 is an elevated diagram that graphically depicts an embodiment of the invention.

As shown in FIG. 2, after the first pressure ring 14 is positioned inside the grommet opening 16, a second pressure ring 18 is secured around both the wiring 10 and grommet opening 16. In this exemplary embodiment, the second pressure ring 18 is positioned directly proximate to the first pressure ring 14 along the wiring 10. In this exemplary embodiment, the second pressure ring 18 is a tie strap. However, those of ordinary skill in the art will understand that a variety of fasteners capable of fitting around the wiring 10 and grommet opening 16 and forcing them together may be employed without departing from the novel scope of the present invention.

Figure 3:
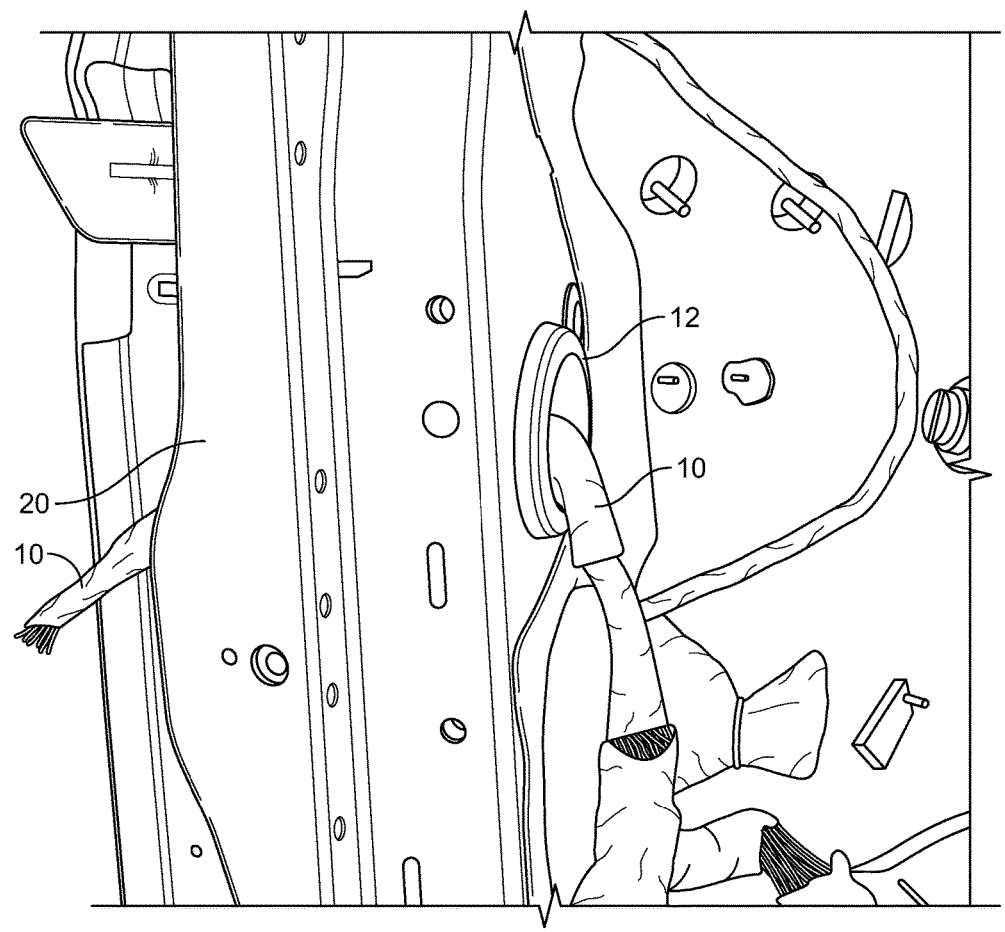
FIG. 3 is an elevated diagram that graphically depicts an embodiment of the invention in a vehicle application.

FIG. 3 shows the positioning of an embodiment of the present invention in a vehicle application. The wiring 10 is secured to the grommet 12 which is enabling the wiring 10 to pass through a vehicle door 20. Those of ordinary skill in the art will understand that embodiments of the present invention may by employed in a wide array of contexts regarding vehicles and other types of applications without departing from the novel scope of the present invention.

It should be understood that the invention is not be limited to any single embodiment and should only be construed in breadth and scope in accordance with recitation of the appended claims.

We claim:

1. A system for securing wiring to a grommet comprising:
a first tie strap disposed around and in contact with the wiring, the first tie strap disposed inside an opening of the grommet;
and a second tie strap disposed around both the wiring and an exterior portion of the grommet.

2. The system of claim 1 wherein the second tie strap is disposed on the exterior of the grommet opening.

3. The system of claim 2 wherein the second tie strap is disposed on the exterior of the grommet opening to secure the wiring to the grommet.

4. The system of claim 2 wherein the first tie strap is disposed inside the grommet and the second tie strap is disposed on the exterior of the grommet to prevent the wiring from slipping relative to the grommet.

5. The system of claim 1 wherein the second tie strap is disposed proximate to the first tie strap along the wiring.

6. The system of claim 1 wherein the grommet has an embedded lubricant.

7. The system of claim 1 wherein the first tie strap is disposed around and in contact with the wiring to bundle the wiring together within the grommet.

8. A method of securing wiring to a grommet comprising the steps of:
securing a first tie strap around and in contact with the wiring;
positioning the grommet such that an opening of the grommet is forced over the first tie strap; and
securing a second tie strap around both the wiring and an exterior portion of the grommet.

9. The method of claim 8 wherein the second tie strap is disposed on the exterior of the grommet opening.

10. The method of claim 9 wherein the second tie strap is disposed on the exterior of the grommet opening to secure the wiring to the grommet.

11. The method of claim 9 wherein grommet is forced over the first tie strap and the second tie strap is disposed on the exterior of the grommet to prevent the wiring from slipping relative to the grommet.

12. The method of claim 8 wherein the second tie strap is disposed proximate to the first tie strap along the wiring.

13. The method of claim 8 wherein the grommet has an embedded lubricant.

14. The method of claim 8 wherein the first tie strap is secured around and in contact with the wiring to bundle the wiring together within the grommet.

* * * * *